United States Patent [19]

Saito

[11] Patent Number: 4,872,703
[45] Date of Patent: Oct. 10, 1989

[54] PASSIVE SEAT BELT SYSTEM

[75] Inventor: Hiroyuki Saito, Chigasaki, Japan

[73] Assignee: Nippon Seiko Kabushiki Kaisha, Tokyo, Japan

[21] Appl. No.: 111,262

[22] Filed: Oct. 22, 1987

[30] Foreign Application Priority Data

Oct. 25, 1986 [JP] Japan .................. 61-162922

[51] Int. Cl.$^4$ ............................................. B60R 21/02
[52] U.S. Cl. ................................. 280/804; 297/469; 297/473
[58] Field of Search ................ 280/804; 297/469, 473

[56] References Cited

U.S. PATENT DOCUMENTS

| 4,324,419 | 4/1982 | Ueda | 280/804 |
| 4,343,489 | 8/1982 | Suzuki et al. | 280/804 |
| 4,354,695 | 10/1982 | Sato | 297/469 |
| 4,444,417 | 4/1984 | Ueda | 280/804 |
| 4,560,187 | 12/1985 | Yoshitsugu | 280/804 |
| 4,607,863 | 8/1986 | Yokote | 280/804 |
| 4,635,964 | 1/1987 | Ryu | 280/804 |

Primary Examiner—Kenneth R. Rice
Attorney, Agent, or Firm—Wegner & Bretschneider

[57] ABSTRACT

A passive seat belt system includes a guide rail, a webbing-carrying movable member and a bracket for mounting the guide rail on a stationary base. The guide rail has an elongated top wall, an elongated bottom wall and two elongated side walls. The movable member extends through a slot formed in the guide rail and is driven along the guide rail. The bracket includes a rail-holding portion enclosing externally one end portion of the guide rail and an extension extending out longitudinally from the one end portion of the guide rail and defining a mounting portion for mounting the bracket on the stationary base.

22 Claims, 5 Drawing Sheets

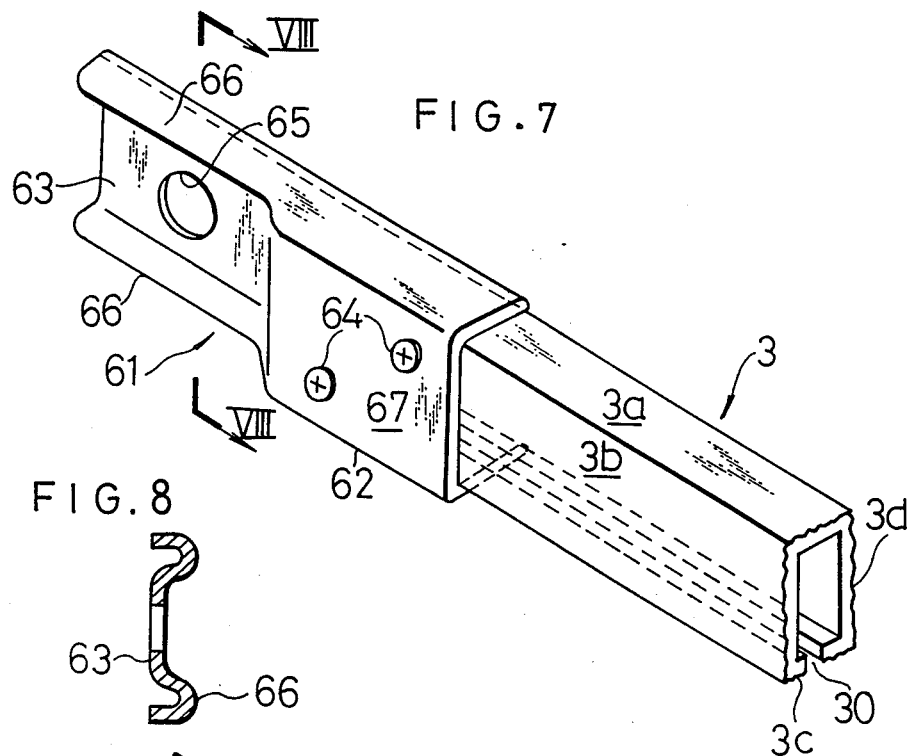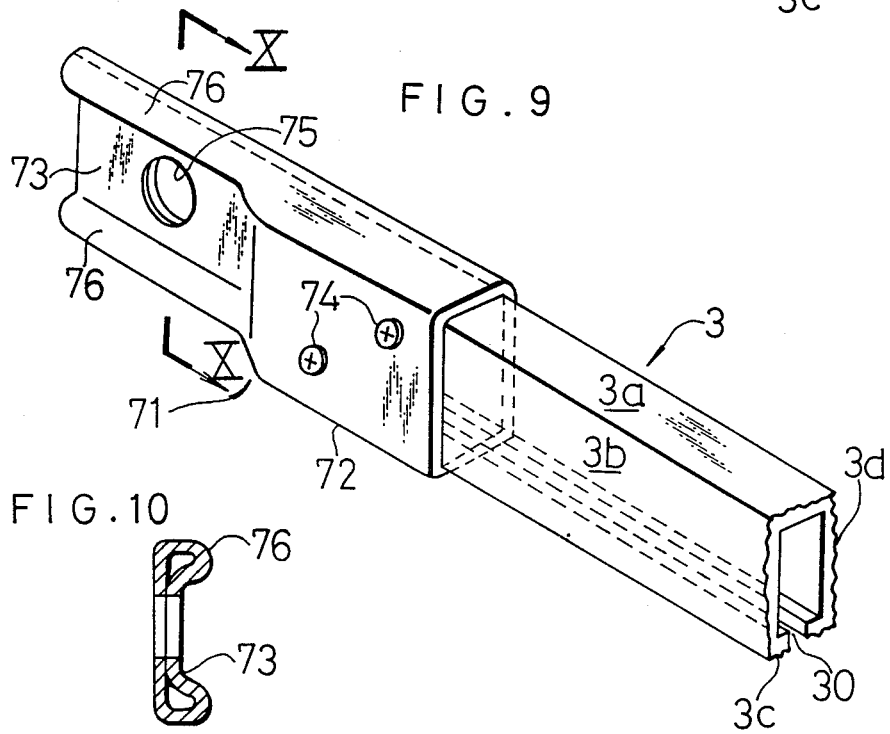

PASSIVE SEAT BELT SYSTEM

BACKGROUND OF THE INVENTION (1) Field of the Invention

This invention relates to a passive seat belt system, and more specifically to a passive seat belt system provided with a rigid holding means at one end portion of a guide rail.

(2) Description of the Prior Art

Passive seat belt systems have been known, which are of such a type that an occupant is automatically restrained upon riding a motor vehicle in order to assure the safety of the occupant in case of an emergency of the vehicle.

In a passive seat belt system of the above type, a slide anchor carrying a buckle, which is latched with a tongue fastened to one end of an occupant-restraining webbing and is releasable in case of an emergency, is caused to move back and forth along the length of the vehicle, on a guide rail and along the roof side of a vehicle, whereby the webbing is brought close to and away from an associated occupant seat so as to form a room sufficient to allow an occupant to get on and off the motor vehicle and also to apply the webbing automatically to the occupant after he has sat in the seat.

The slide anchor is movable freely between both ends of the guide rail. The rigidity of the guide rail is lower at both ends (front and rear ends) thereof compared with its rigidity at its intermediate portion. Further, the buckle may undergo substantial displacements, namely, may swing in the direction of the width of the vehicle while the passive seat belt system is in use Such undue swinging of the buckle has a potential danger such that an associated interior trimming may be lifted off or damaged and the guide rail may be damaged or deformed. A damage to the guide rail or its deformation may result in a poor operation of the passive seat belt.

To cope with this potential problem, it may be contemplated to enlarge the dimensions of the guide rail itself so that its rigidity is improved. This approach is however difficult to practise since pillars are designed narrower in recent motor vehicles.

SUMMARY OF THE INVENTION

With the foregoing in view, the present invention has as a principal object thereof the provision of a passive seat belt system which is free of the problems mentioned above and has improved the rigidity of both end portions of a guide rail by a simple structure.

In one aspect of this invention of the present invention, there is thus provided a passive seat belt system comprising:

a guide rail having an elongated top wall, an elongated bottom wall and two elongated side walls extending spacedly between the top and bottom walls and defining a slot longitudinally in the bottom wall;

a movable member extending through the slot formed in the guide rail and connected to an associated occupant restraining webbing; and a bracket provided at one end portion of the guide rail and adapted to mount the guide rail on a stationary base, said bracket including a rail-holding portion enclosing externally said one end portion of the guide rail and an extension extending out longitudinally from said one end portion of the guide rail and defining a mounting portion for mounting the bracket on the stationary base.

The bracket may preferably be formed of a plate-like material or a tubular hollow material.

Owing to the provision of the rail-holding portion, the rigidity of the associated one end portion of the guide rail is maintained at a sufficiently high level so that the guide is protected from damages and the like. The passive seat belt system according to this invention therefore assures smooth and safe functioning.

BRIEF DESCRIPTION OF THE DRAWINGS

The above and other objects, features and advantages of the present invention will become apparent from the following description and the appended claims, taken along the accompanying drawings in which:

FIGS. 7 and 8 are a perspective view and transverse cross-sectional view of a guide rail end portion, showing a fifth embodiment of this invention;

FIGS. 9 and 10 are a perspective view and transverse cross-sectional view of a guide rail end portion, showing a sixth embodiment of this invention;

DETAILED DESCRIPTION OF THE INVENTION AND PREFERRED EMBODIMENTS

Figure 1:
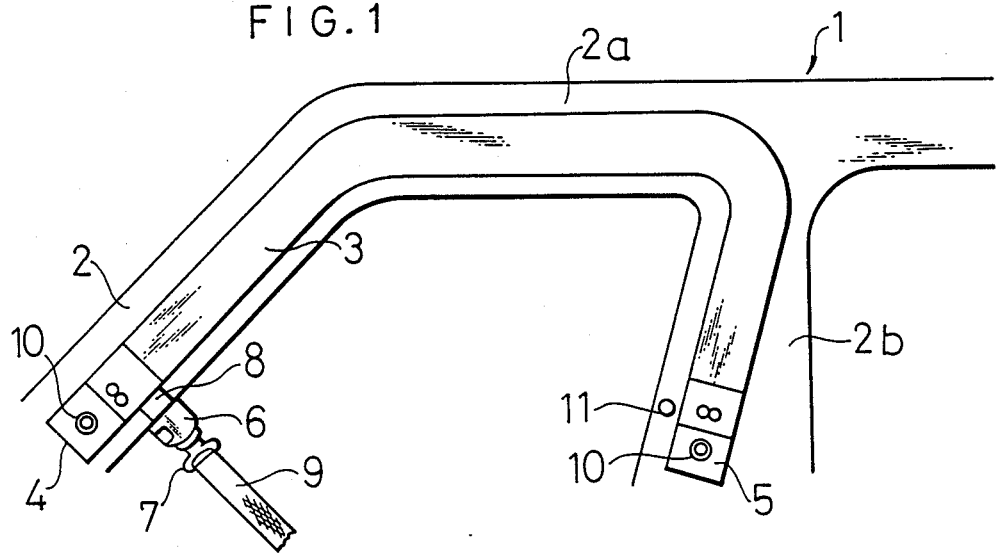
FIG. 1 is a schematic illustration showing the entirety of a passive seat belt system according to the present invention.

The respective embodiments of this invention will hereinafter be described in detail with reference to the accompanying drawings, in which like elements of structure will be identified by like reference numerals.

The passive seat belt system depicted in FIG. 1 is common to all the embodiments. Both end portions of a guide rail 3, which extends along a front pillar 2, roof side 2a and center pillar 2b in the direction of the length of a vehicle 1, are secured to bracket members, namely, brackets 4,5 by means of self-tapping screws. The brackets 4,5 are in turn fixed on the respective pillars 2,2b by their corresponding anchor bolts 10. Accordingly, the guide rail 3 is also fixed on both pillars 2,2b.

Although not illustrated specifically in the drawing, the guide rail 3 is of course fastened at several intermediate locations between both end portions thereof to the pillars 2,2b or roof side 2a by a desired method.

Figure 3:
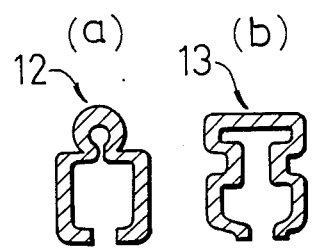
FIGS. 3(a) and 3(b) are transverse cross-sectional views showing exemplary modifications of the guide rail respectively.

The guide rail 3 has a hollow shape and presents a substantially rectangular transverse cross-section. The guide rail 3 defines through one of its walls a slot which extends along the length of the guide rail 3 as will be described subsequently. Engaged slidably with the slot is a slide anchor 8 carrying a buckle 6 which can release an associated webbing 9 in case of an emergency. Generally, the webbing 9 is coupled to the buckle 6 by way of a tongue 7 fastened to one end of the webbing 9. Accordingly, the buckle 6, tongue 7 and webbing 9 move together between both end portions of the guide rail 3 as the slide anchor 8 slides on the guide rail 3. A stopper 11 or other latch mechanism is provided in the vicinity of one of the end portions of the guide rail 3, said one end portion being on the side of the center pillar 2b, whereby the slide anchor 8 is locked with the webbing 9 restraining an occupant in an unillustrated front seat. Needless to say, the transverse cross-sectional shape of the guide rail 3 is not necessarily limited to the rectangular shape. It may have other transverse cross-sectional shapes such as those depicted in FIGS. 3(a) and 3(b) respectively.

Figure 2:
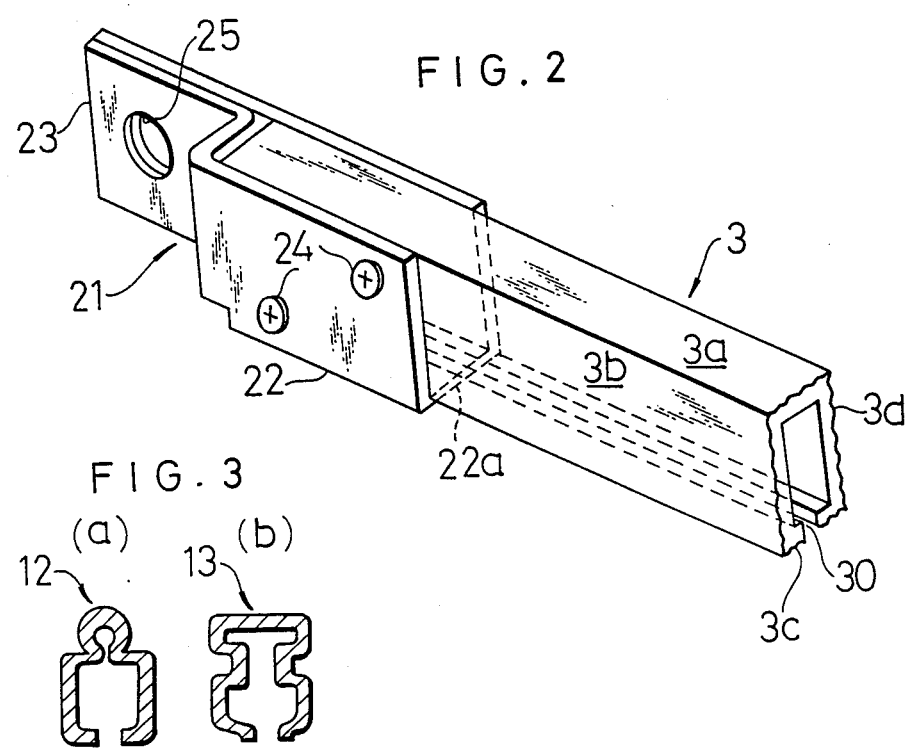
FIG. 2 is a perspective view of a guide rail end portion, showing a first embodiment of this invention.

FIG. 2 illustrates the structure of one end portion of the guide rail 3, showing the first embodiment of this invention. As clearly shown in the drawing, the guide rail 3 has a substantially-rectangular hollow transverse cross-section. In all the other embodiments to be described subsequently, the rail 33 has substantially the same shape. The rail 3 is formed of 4 walls, namely, an upper wall 3a, a lower wall 3c and a pair of side walls 3b,3d. The upper wall 3a and lower wall 3c oppose each other, while the side walls 3b,3d are opposite to each other. A slot 30 having a predetermined width is formed through the lower wall 3c along the length of the guide rail 3, so that the slide anchor 8 is supported slidably in the slot 30. A bracket 21 is composed of a planar portion 23 and a rail-holding portion 22. The planar portion defines a bore 25 through which a corresponding anchor bolt 10 extends. The rail-holding portion 22 is integral with the planar portion 23 and is formed substantially into a square U-shape as viewed in a cross-section taken along a plane perpendicular to the length of the guide rail 3. The rail 3 is held at one end portion thereof in the rail-holding portion 22 with its side walls 3b,3d and lower wall 3c maintained in contact with the rail-holding portion 22. It should be noted that the lower wall 3c of the guide rail 3 is in a contiguous relation with a lower wall 22a connecting both side walls of the rail-holding portion 22 of the square U-shaped transverse cross-section. The side wall 3b of the guide rail 3 is fixed to the corresponding side walls of the rail-holding portion 22 by means of two self-tapping screws 24. In the first embodiment, the guide rail 3 is therefore held at three sides thereof, namely, the side walls 3b,3d and lower wall 3c by the rail-holding portion 22 of the bracket 21. Owing to the structure described above, the rigidity of the guide rail 3 is maintained sufficiently, especially, in the direction extending between the side walls 3b and 3d.

Figure 4:
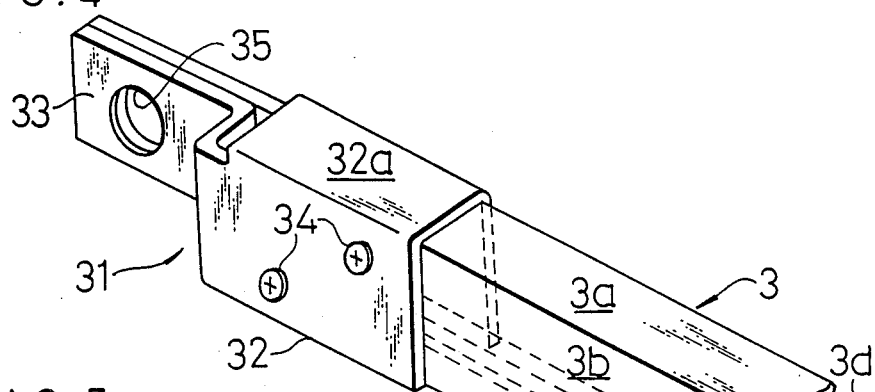
FIG. 4 is a perspective view of a guide rail end portion, showing a second embodiment of this invention.

The second embodiment will next be described with reference to FIG. 4. In the second embodiment, a bracket 31 is composed of a planar portion 33 defining a bore 35 and a rail-holding portion 32 which is integral with the planar portion 33 and has a square U-shaped transverse cross-section. In the second embodiment, the guide rail 3 is held in such a way that its upper wall 3a is maintained in contact with a connecting upper wall 32a of the rail-holding portion 32. The side wall 3b is fixed on one of both side walls of the rail-holding portion 32 by means of two self-tapping screws 34. Accordingly, the guide rail 3 is supported at the three sides thereof and its rigidity is also maintained sufficiently, especially, in the direction extending between the side walls 3b and 3d.

Figure 5:
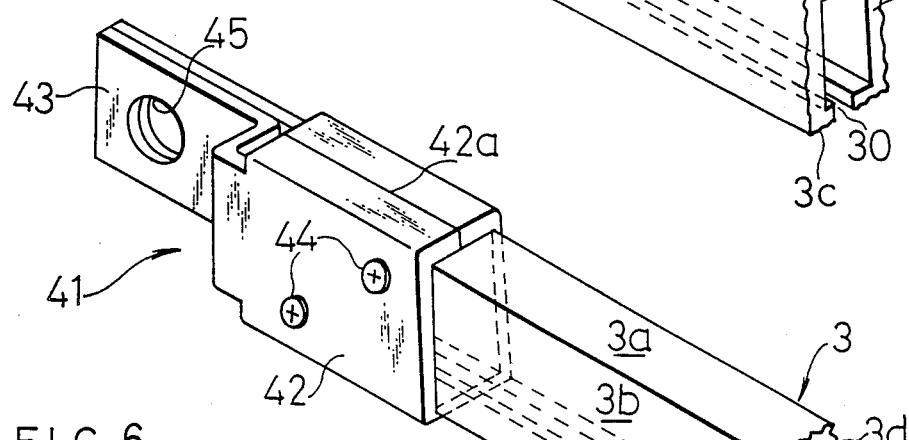
FIG. 5 is a perspective view of a guide rail end portion, showing a third embodiment of this invention.

The third embodiment is now described with reference to FIG. 5. A bracket 41 is press-formed from a single steel plate and is composed of a planar portion 43 defining a bore 45 and a box-like portion 42 holding one end portion of the guide rail 3. Further, the side wall 3b is fixed by two self-tapping screws 44 on one of both side walls of the box-like portion 42 at locations between both longitudinal ends of both edges 42a which have been brought into abutment in order to enhance the rigidity of the box-like portion 42. In the third embodiment, the guide rail 3 is supported at the four sides, namely, all the walls thereof so that the rigidity of the guide rail 3 is maintained particularly well.

Figure 6:
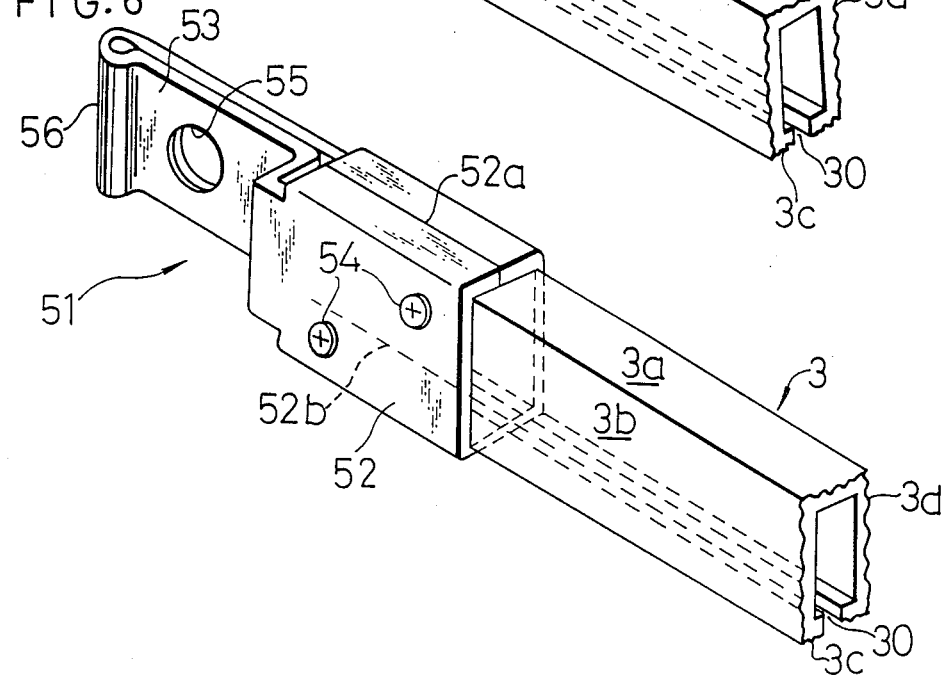
FIG. 6 is a perspective view of a guide rail end portion, showing a fourth embodiment of this invention.

FIG. 6 illustrates the fourth embodiment of this invention, in which a bracket 51 is formed by folding over a single steel plate along a fold line substantially perpendicular to the length thereof and bringing upper longitudinal edges 52a and lower longitudinal edges 52b of both free end parts of the thus folded-sections of the steel plate into mutual abutment respectively on the sides of both top and bottom walls 3a,3c of the guide rail 3. The free end parts form a box-like portion 52 of the bracket 51. A bent portion 56 is hence formed at the free end of a planar portion 53. The box-like portion holding the end portion of the guide rail 3 is of substantially the same structure as that of the third embodiment and the side wall 3b of the guide rail 3 is fixed on one of side walls of the box-like portion 52 by means of two self-tapping screws 54. The guide rail 3 is also supported at four sides, namely, all the walls thereof in this embodiment, whereby the rigidity of the guide rail 3 is maintained particularly well.

Next, the fifth embodiment of this invention will be described with reference to FIGS. 7 and 8. In this embodiment, a bracket 61 defines a bore 65 and is composed of a planar portion 63 and a rail-holding portion 62 having a square U-shaped transverse cross-section. The planar portion 63 is provided with bent portions 66 respectively along both longitudinal edges thereof. The side wall 3b of the guide rail 3 are fixed by two self-tapping screws 64 on a connecting side wall 67 of the rail-holding portion 62, so that the guide rail 3 is held on the rail-holding portion 62. The guide rail 3 is therefore supported at 3 sides thereof in this embodiment, whereby the rigidity of the guide rail 3 is maintained. Since the bent portions 66 are provided at both longitudinal edges of the planar portion 63 in this embodiment as shown more clearly in FIG. 8, the strength of the bracket 61 has been improved.

The sixth embodiment of this invention are now described with reference to FIGS. 9 and 10. A bracket 71 is formed by machining a tubular hollow material by press-forming or the like and is composed of a planar portion 73 and a box-like portion 72 in which one end portion of the guide rail 3 is received. The planar portion 73 defines a bore 75 and as best shown in FIG. 10, has bent portions 76 at both longitudinal edges thereof respectively. The guide rail 3 is fixed at the side wall 3b on one of both side walls of the box-like portion 72 by means of two self-tapping screws 74. Accordingly, the guide rail 3 is supported at 4 sides, namely, all the walls thereof by the bracket 71 so that the rigidity of the guide rail 3 is maintained sufficiently. Since the bent portions 76 are provided at both longitudinal edges of the planar portion 73 in this embodiment as shown in FIG. 10, the strength of the bracket 71 has been improved.

Figure 11:
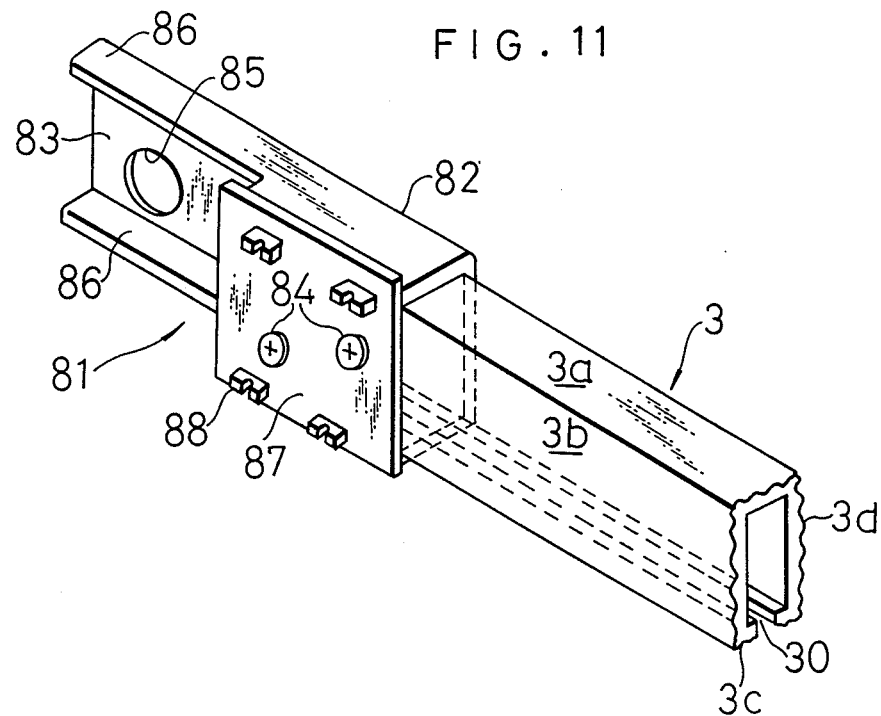
FIG. 11 is a perspective view of a guide rail end portion, showing a seventh embodiment of this invention.

The seventh embodiment of this invention will next be described with reference to FIG. 11. A bracket 81 defines a bore 85 and is composed of a planar portion 83 and a rail-holding portion 82 having a square U-shaped transverse cross-section. The planar portion 83 is equipped with flanges 86 which extend at right angles from both longitudinal edges of the planar portion 83. Each of the free edges of mutually-opposing upper and lower walls of the rail-holding portion 82 is provided with two projections 88, whereby four projections 88 are provided in total. A cover 87 extends between the free edges of the upper and lower walls of the rail-holding portion 82 so as to cover the opening of the rail-holding portion 82. The projections 88 extend through their corresponding holes formed through the cover 87 so that the rail-holding portion 82 presents a box-like shape as a whole. The side wall 3b of the guide rail 3 is fixed on the cover 87 by means of two self-tapping screws 84. Since the guide rail 3 is supported at 4 sides, namely, all the walls thereof by the bracket 81, the rigidity of the guide rail 3 is maintained sufficiently.

Figure 12:
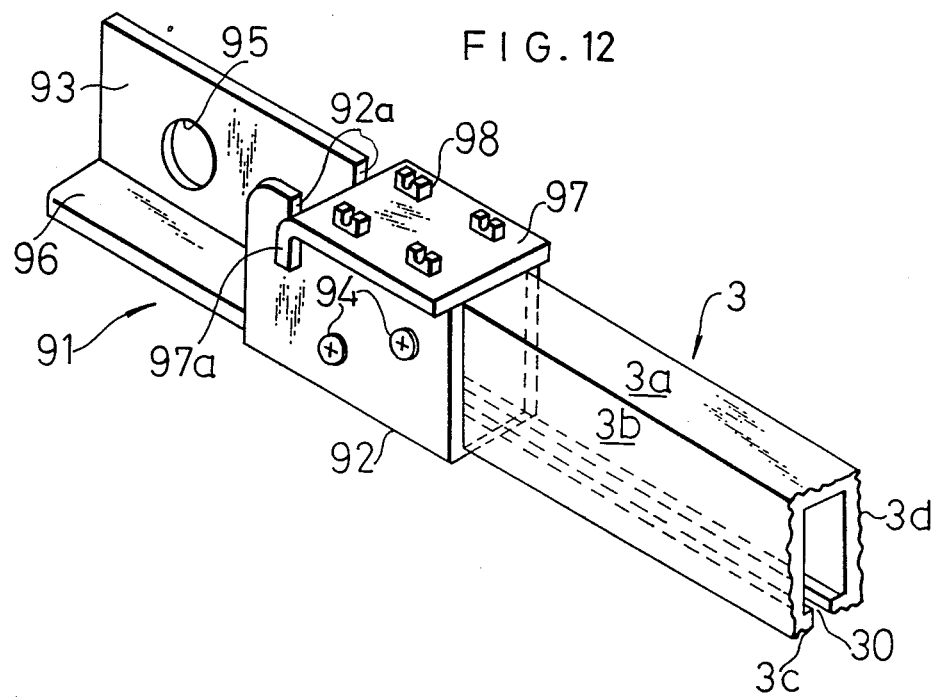
FIG. 12 is a perspective view of a guide rail end portion, showing an eighth embodiment of this invention.

The eighth embodiment of this invention is illustrated in FIG. 12. A bracket 91 defines a bore 95 and is composed of a planar portion 93 and a rail-holding portion 92 having a square U-shaped transverse cross-section. The planar portion 93 is equipped with a flange 96 which extends at a right angle from one of longitudinal edges of the planar portion 93. Each of the free edges of mutually-opposing side walls of the rail-holding portion 92 is provided with two projections 98, whereby four projections 98 are provided in total. A cover 97 extends between the free edges of both side walls of the rail-holding portion 92 so as to cover the opening of the rail-holding portion 92. The projections 98 extend through their corresponding holes formed through the cover 97 so that the rail-holding portion 92 presents a box-like shape as a whole. The side wall 3b of the guide rail 3 is fixed on one of the side walls of the rail-holding portion 92 by means of two self-tapping screws 94. Since the guide rail 3 is supported at 4 sides, namely, all the walls thereof by the bracket 91, the rigidity of the guide rail 3 is maintained sufficiently. In addition, the cover 97 terminates in the direction of a hypothetical longitudinal extension of the guide rail 3 in a portion 97a bent downwardly and perpendicularly. The bent portion 97a engages notches 92a formed in the mutually-opposing side walls of the rail-holding portion 9 so that the cover 97 is fixed surely on the rail-holding portion 92.

Figure 13:
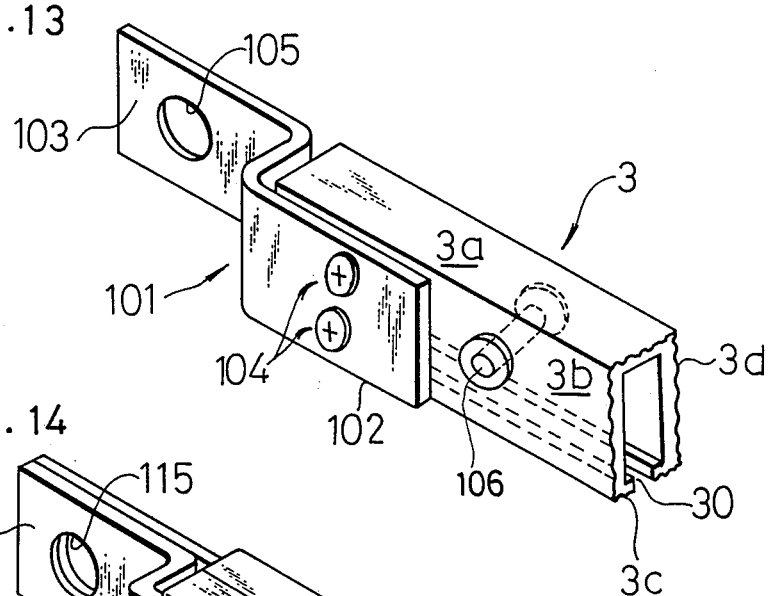
FIG. 13 is a perspective view of a guide rail end portion, showing a ninth embodiment of this invention.

Next, the ninth embodiment will be described with reference to FIG. 13. A bracket 101 is composed of a planar portion 103 defining a bore 105 and a rail-holding portion 102 extending in a bent form from the planar portion 103. The side wall 3b of the guide rail 3 is fixed to the rail-holding portion 102 by two self-tapping screws 104. Since a pin 106 extends through the guide rail 3 at a point near the bracket 101 in the ninth embodiment, the rigidity of the guide rail 3 is maintained at the side walls 3b,3d owing to the provision of the pin 106.

Therefore, the guide rail 3 is held at both side walls so that the rigidity of the guide rail 3 is maintained sufficiently and is prevented from opening. Needless to say, a long self-tapping screw, a combination of a bolt and nut, or the like may be used instead of the pin 106.

Figure 14:
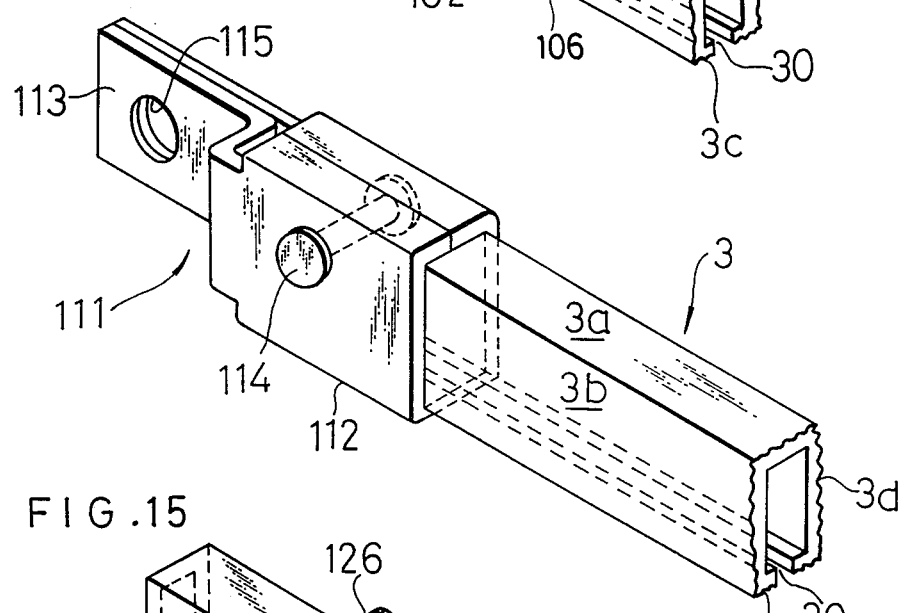
FIG. 14 is a perspective view of a guide rail end portion, showing a tenth embodiment of this invention.

FIG. 14 depicts the tenth embodiment of this invention. A bracket 111 of this embodiment is substantially the same as that shown in FIG. 5 and is composed of a planar portion, which defines a bore 115, and a box-like portion 112. A pin 114 extends through the box-like portion 112. The pin 114 serves to fix the guide rail 3 on the bracket 111 and also to maintain the rigidity of the guide rail 3. Since the guide rail 3 is held at two sides thereof, the rigidity of the guide rail 3 is maintained sufficiently. Needless to say, a long self-tapping screw, a combination of a bolt and nut, or the like may be used instead of the pin 106.

Figure 15:
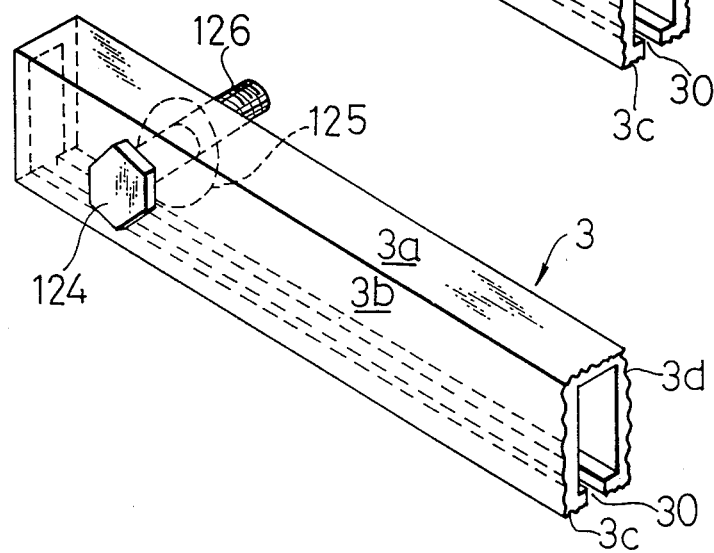
FIG. 15 is a perspective view of a guide rail end portion, showing an eleventh embodiment of this invention.

Finally, the eleventh embodiment of this invention will be described with reference to FIG. 15. In this embodiment, no bracket is used but the rail 3 is fixed at two sides thereof by a stepped bolt 124 and a retainer ring, namely, a nut 125. Accordingly, the rigidity of the guide rail 3 is maintained at the same two sides. Since no bracket is included, the guide rail 3 is fixed directly on the corresponding pillar by way of an extension 126 of the stepped bolt 124.

In the respective embodiments, the bores 25, 35, 45, 55, 65, 75, 85, 95, 105 and 115 are each provided for the insertion of an anchor bolt therethrough. In the first to eighth embodiments, each bracket also serves as a means for maintaining the rigidity of the guide rail 3. On the other hand, such a rigidity-maintaining means is formed by the pin 106 in the ninth embodiment, the bracket 111 and pin 114 in the tenth embodiment, and the stepped bolt 124 in the eleventh embodiment.

Needless to say, the rigidity-maintaining means for the guide rail 3, which means has been described above, may be provided at only one end portion of the guide rail 3 or at both end portions thereof.

Having now fully described the invention, it will be apparent to one of ordinary skill in the art that many changes and modifications can be made thereto without departing form the spirit or scope of the invention as set forth herein.

I claim:

1. A passive seat belt system comprising:
   a guide rail having an elongated top wall, an elongated bottom wall and two elongated side walls extending spacedly between the top and bottom walls and defining a slot longitudinally in the bottom wall;
   a movable member extending through the slot formed in the guide rail and connected to an associated occupant restraining webbing; and
   a bracket provided at one end portion of the guide rail and adapted to mount the guide rail on a stationary base, said bracket being formed of a plate-like material and including a rail-holding portion, which encloses externally said one end portion of the guide rail so as to maintain said rail-holding portion in contact with a portion of at least three of the top wall, side walls and bottom wall of the guide rail, and an extension extending out further longitudinally from the rail-holding portion and defining a mounting bore only at the extension for mounting the bracket on the stationary base.

2. The passive seat belt system as claimed in claim 1, wherein the rail-holding portion is formed substantially into a U-shape closed on the side of the elongated bottom wall of the guide rail as viewed in a cross-section taken along a plane perpendicular to the length of the guide rail.

3. The passive seat belt system as claimed in claim 2, wherein the extension is composed of a first portion and second portion, the first portion extends out in the direction of the length of the guide rail from a part of the rail-holding portion, said part being on the side of one of the elongated side walls, and the second portion extends out from another part of the rail-holding portion, said another part being on the side of the other elongated side walls, first in a direction approaching the first portion and further in the direction of the length of the guide rail and in a contiguous relation with the first portion.

4. The passive seat belt system as claimed in claim 1, wherein the rail-holding portion is formed substantially into a U-shape closed on the side of the elongated top wall of the guide rail as viewed in a cross-section taken along a plane perpendicular to the length of the guide rail.

5. The passive seat belt system as claimed in claim 1, wherein the rail-holding portion has a tubular shape and covers the outer circumference of said one end portion of the guide rail.

6. The passive seat belt system as claimed in claim 5, wherein the tubular rail-holding portion is formed by bringing both longitudinal edges of the corresponding part of the plate-like material into abutment on the side of the elongated top wall of the guide rail.

7. The passive seat belt system as claimed in claim 6, wherein the extension is composed of a first portion and second portion, the first portion extends out in the direction of the length of the guide rail from a part of the rail-holding portion, said part being on the side of one of the elongated side walls, and the second portion extends out from another part of the rail-holding portion, said another part being on the side of the other elongated side walls, first in a direction approaching the first portion and further in the direction of the length of the guide rail and in a contiguous relation with the first portion.

8. The passive seat belt system as claimed in claim 5, wherein the tubular rail-holding portion is formed by folding over the plate-like material along a fold line substantially perpendicular to the length thereof and then bringing the upper longitudinal edges and lower longitudinal edges of both free end parts of the thus folded-sections of the plate-like material into mutual abutment respectively on the sides of both top and bottom walls of the guide rail.

9. The passive seat belt system as claimed in claim 8, wherein the extension is composed of a first portion and second portion, the first portion extends out in the direction of the length of the guide rail from a part of the rail-holding portion, said part being on the side of one of the elongated side walls, the second portion extends out from another part of the rail-holding portion, said another part being on the side of the other elongated side walls, first in a direction approaching the first portion and further in the direction of the length of the guide rail and in a contiguous relation with the first portion, and the . first and second portions are the thus-folded sections of the plate-like material other than the free end parts thereof.

10. The passive seat belt system as claimed in claim 1, wherein the rail-holding portion is formed substantially into a U-shape as viewed in a cross-section taken along a plane perpendicular to the length of the guide rail, and the U-shaped cross-section is opening on the side of the stationary base when the guide rail is mounted on the stationary base.

11. The passive seat belt system as claimed in claim 10, wherein the extension defines bent edge portions along both longitudinal sides thereof.

12. A passive seat belt system comprising:
a guide rail having an elongated top wall, an elongated bottom wall and two elongated side walls extending spacedly between the top and bottom walls and defining a slot longitudinally in the bottom wall;
a movable member extending through the slot formed in the guide rail and connected to an associated occupant restraining webbing; and
a bracket provided at one end portion of the guide rail and adapted to mount the guide rail on a stationary base, said bracket being formed of a tubular hollow material and including a rail-holding portion enclosing externally said one end portion of the guide rail and an extension extending out longitudinally from said one end portion of the guide rail, formed by collapsing the corresponding part of the tubular hollow material, and defining a mounting portion for mounting the bracket on the stationary base.

13. The passive seat belt system as claimed in claim 12, wherein the extension defines bent edge portions along both longitudinal sides thereof.

14. The passive seat belt system as claimed in claim 1, wherein the bracket is formed substantially into a square U shape as viewed in a cross-section taken along a plane perpendicular to the length of the guide rail, the square U shape is opening away from the stationary base when the guide rail is mounted on the stationary base, and the system further comprises a cover closing the opening side of the square U-shaped bracket and means for attaching the cover to the bracket.

15. The passive seat belt system as claimed in claim 14, wherein the extension is formed substantially into a square U shape opening away from the stationary base when the guide rail is mounted on the stationary base.

16. The passive seat belt system as claimed in claim 1, wherein the bracket is formed substantially into a square U shape as viewed in a cross-section taken along a plane perpendicular to the length of the guide rail, the square U shape is closed on the side of the elongated bottom wall of the guide rail, and the system further comprises a cover closing the opening side of the square U-shaped bracket on the side of the elongated top wall of the guide rail and means for attaching the cover to the bracket.

17. The passive seat belt system as claimed in claim 16, wherein the extension is equipped with a flange on the side of the elongated bottom wall of the guide rail, the flange extends substantially at a right angle relative to the extension as viewed in a cross-section taken along a plane perpendicular to the length of the extension, and the extension together with the flange has a substantially L-shaped transverse cross-section.

18. The passive seat belt system as claimed in claim 1, further comprising a means for connecting the guide rail and bracket to each other.

19. The passive seat belt system as claimed in claim 18, wherein the connecting means connects the rail-holding portion and guide rail to each other.

20. The passive seat belt system as claimed in claim 1, further comprising a means for connecting both side walls of the guide rail to each other between the top and bottom walls of the guide rail.

21. The passive seat belt system as claimed in claim 20, wherein the connecting means connects both side walls of the guide rail via the bracket.

22. A passive seat belt system comprising:
- a guide rail having an elongated top wall, an elongated bottom wall and two elongated side walls extending spacedly between the top and bottom walls and defining a slot longitudinally in the bottom wall;
- a movable member extending through the slot formed in the guide rail and connected to an associated occupant restraining webbing; and
- a bracket provided at one end portion of the guide rail and adapted to mount the guide rail on a stationary base, said bracket including a rail-holding portion enclosing externally said one end portion of the guide rail so as to maintain the rail-holding portion in contact with the top wall, side walls and bottom wall of the guide rail and an extension extending out further longitudinally from the rail-holding portion and defining a mounting bore only at the extension for mounting the bracket on the stationary base.

* * * * *